Figure 1:
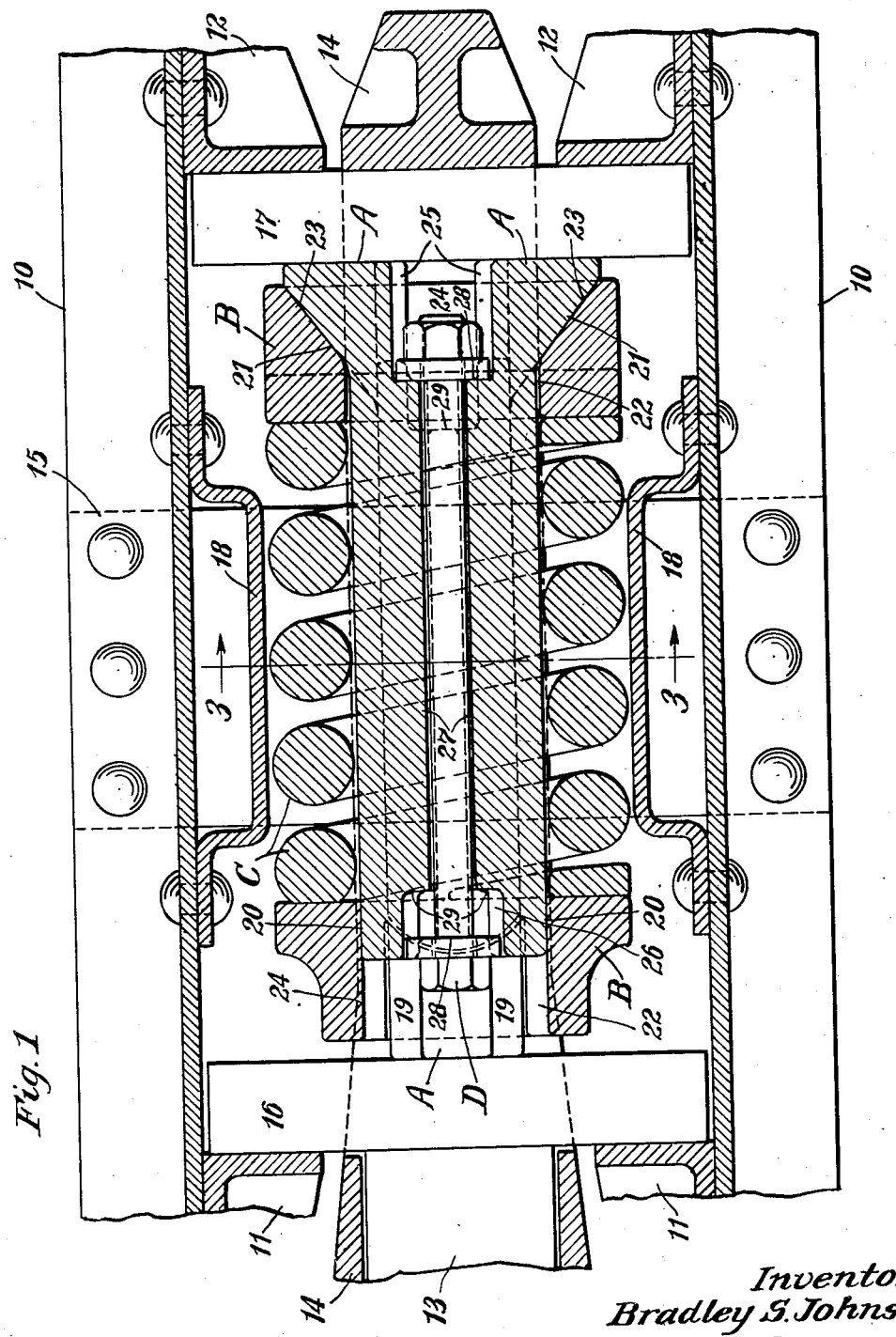

Sept. 11, 1934.   B. S. JOHNSON   1,973,079
FRICTION SHOCK ABSORBING MECHANISM
Filed Feb. 13, 1932   2 Sheets-Sheet 1

Inventor
Bradley S. Johnson
By Henry Fuchs Atty.

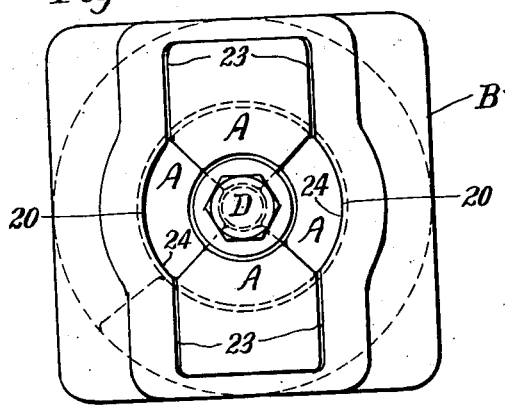
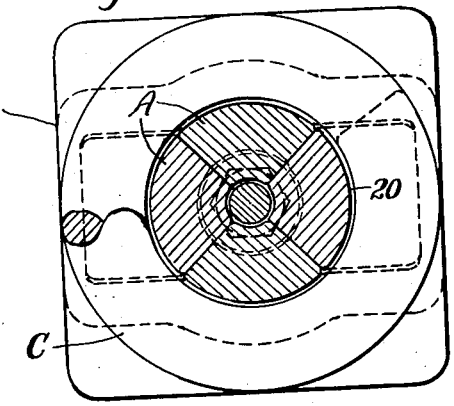
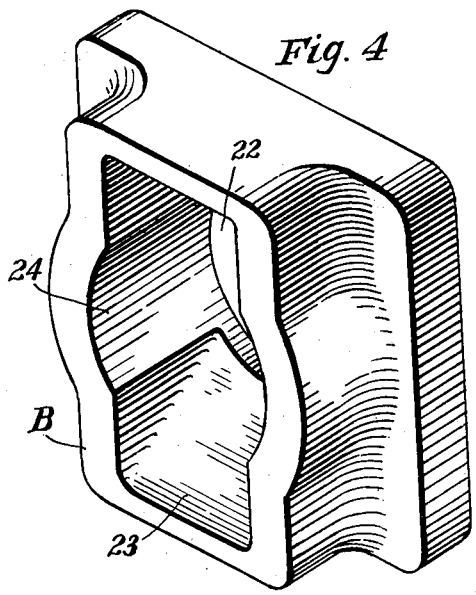
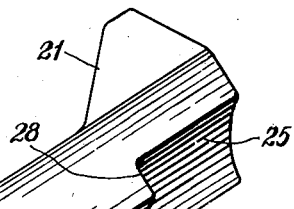
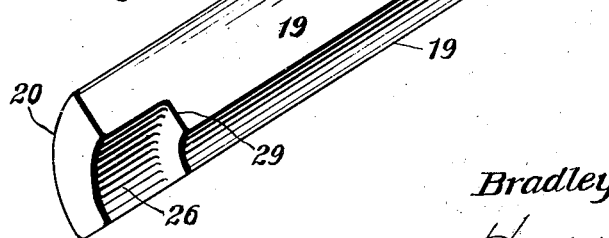

Patented Sept. 11, 1934

1,973,079

UNITED STATES PATENT OFFICE 1,973,079

FRICTION SHOCK ABSORBING MECHANISM

Bradley S. Johnson, Highland Park, Ill., assignor to W. H. Miner, Inc., Chicago, Ill., a corporation of Delaware Application February 13, 1932, Serial No. 592,686

9 Claims. (Cl. 213—22)

This invention relates to improvements in friction shock absorbing mechanisms.

One object of the invention is to provide a friction shock absorbing mechanism of exceptionally high capicity, which may be economically manufactured.

Another object of the invention is to provide a friction shock absorbing mechanism, especially adapted for railway draft riggings, having high frictional capacity to dampen and absorb shocks, said frictional capacity being produced by a plurality of relatively movable, longitudinally disposed friction elements, wherein the friction elements are forced into tight frictional engagement by spring resisted wedge means comprising wedge-acting spring follower members at opposite ends of the longitudinally disposed friction elements, which spring followers also have friction surfaces cooperating with certain of said elements to augment the frictional resistance.

Other objects of the invention will more clearly appear from the description and claims hereinafter following.

In the drawings, forming a part of this specification, Figure 1 is a horizontal, longitudinal sectional view through the underframe structure of a railway car, illustrating my improvements in connection therewith. Figure 2 is a front end elevational view of the shock absorbing mechanism proper shown in Figure 1. Figure 3 is a transverse, vertical sectional view, corresponding substantially to the line 3—3 of Figure 1. And Figures 4 and 5 are detail perspective views respectively of a spring follower and a friction element employed in connection with my improvements.

In said drawings, 10—10 indicate channel-shaped center or draft sills of the underframe structure of a railway car, having front stop lugs 11—11 and rear stop lugs 12—12 on the inner sides thereof. The inner end of the coupler shank is indicated by 13 and is operatively connected to a hooded yoke 14 of well-known form. The yoke is supported by the usual saddle plate 15 fixed to the bottom flanges of the draft sills. My improved shock absorbing mechanism, together with front and rear followers 16 and 17, is enclosed within the yoke. As shown in Figure 1, the inner sides of the sills 10—10 are also provided with filler castings or plates 18—18, which serve to center and guide the shock absorbing mechanism between the sills.

My improved shock absorbing mechanism proper comprises broadly two pairs of longitudinally disposed friction elements A—A and A—A; front and rear spring followers B—B; a main spring resistance C; and a retainer bolt D.

The friction elements of the two pairs A—A and A—A are arranged in a central group disposed lengthwise of the mechanism. Each friction element A is of substantially V-shaped transverse cross section, as clearly shown in Figures 3 and 5, and presents a longitudinally disposed V-shaped friction surface 19 on the inner side thereof having the two sections thereof disposed in planes respectively radial to the longitudinal axis of the mechanism. As clearly shown in Figures 1 and 3, the V-shaped friction surfaces 19—19 of one pair of elements A—A engage the V-shaped friction surfaces 19—19 of the elements A—A of the other pair. Each friction element A also has a longitudinally disposed, transversely curved, exterior friction surface 20 extending for the greater portion of the length thereof. At one end, each friction element A is also provided with an exterior wedge face 21, for a purpose hereinafter pointed out. As clearly illustrated in Figure 1, the friction elements A—A of one pair are reversely arranged end for end with respect to the friction elements A—A of the other pair, that is, the friction elements of one pair have the wedge faces 21—21 disposed at the rear end of the mechanism while the friction elements A—A of the other pair have the wedge faces 21—21 thereof disposed at the front end of the mechanism.

The front and rear spring followers B—B are of similar design, each having an opening 22 therethrough adapted to accommodate the corresponding end of the group of friction elements. Each follower has a pair of opposed interior wedge faces 23—23 and a pair of opposed interior friction surfaces 24—24, as clearly shown in Figures 1, 2, and 4. The two spring followers are reversely arranged, as clearly shown in Figure 1, and are so positioned that the wedge faces of one of the spring followers are disposed in planes which intersect the planes of the wedge faces of the other spring follower at right angles; in other words, one spring follower is rotated with respect to the other spring follower through an angle of 90° about the longitudinal axis of the mechanism.

The friction elements A—A of the pair having the wedge faces 21—21 at the rear ends are in flat bearing engagement with the front face of the rear follower 17, while the front ends of said elements are spaced from the front follower 16. The pair of friction elements having the wedge faces 21—21 at the forward ends thereof have flat bearing engagement with the inner face of the front follower 16 and have their rear ends spaced from the rear follower 17.

The main spring resistance C, which is in the form of a relatively heavy coil, surrounds the group of friction elements and is interposed between the front and rear spring followers B—B, bearing on the inner sides of these followers.

The mechanism is held assembled and of uniform overall length by the retainer bolt D, which is disposed axially of the device and has its opposite ends anchored to the two pairs of friction elements respectively. As most clearly shown in Figure 5, each friction element A is recessed at opposite ends on the inner side, as indicated at 25 and 26 respectively, to accommodate the head and the nut of the bolt respectively, together with retaining washers or shims. The inner side of each friction element A is also longitudinally grooved, as indicated at 27, to accommodate the shank of the bolt. The recess sections 25 and 26 of the friction element A provide shoulders 28 and 29 respectively. The shoulders 28 of the elements A cooperate with the bolt to limit outward movement of said elements. In the normal position of the parts, the shoulders 29 are spaced from the corresponding end of the bolt, as clearly shown in Figure 1, to permit a certain amount of movement of each pair of elements A—A with respect to the bolt. It is further pointed out that in the normal position of the parts, the outer ends of the spring followers are spaced from the front and rear followers of the shock absorbing mechanism so that engagement of the ends of the two pairs of plates by the main followers is assured.

In the operation of my improved shock absorbing mechanism, during either a buff or draft action of the railway draft rigging, the front follower 16 and the rear follower 17 will be moved inwardly toward each other, thereby forcing one pair of friction elements to slide lengthwise along the other pair. Inasmuch as the wedge faces 21—21 of each pair of elements A—A are in wedging engagement with one of the spring followers B, these elements will be wedged laterally inwardly or toward the longitudinal central axis of the mechanism. As the V-shaped friction surfaces 19—19 of each pair of friction elements are in engagement with the other pair of elements, the elements of the last named pair will be wedged apart laterally, that is, will be forced radially outwardly with respect to the central longitudinal axis of the mechanism, thereby bringing the exterior friction surfaces 20 thereof into tight frictional engagement with the interior friction surfaces 24—24 of the spring follower B at the opposite end of the mechanism. During the relative movement of the two pairs of friction elements lengthwise of the mechanism, the spring followers will approach each other and have their movement yieldingly resisted by the main spring C. This action continues until the mechanism is fully compressed, and further movement is prevented by engagement of the opposite ends of both pairs of friction elements A—A and A—A with the front and rear followers 16 and 17 of the shock absorbing mechanism. In release, when the actuating force is reduced, the expansive force of the spring C separates the spring followers B—B lengthwise of the mechanism. Inasmuch as each spring follower B is in wedging engagement with one of the pairs of friction elements, the two pairs of friction elements will be moved outwardly away from each other lengthwise of the mechanism, thereby restoring the same to the full release position shown in Figure 1. Rearward movement of one of said pairs of friction elements A—A is limited by the shoulders 28—28 thereof engaging the retaining shim or washer at the rear end of the retaining bolt D while forward movement of the other pair of elements A—A is limited by engagement of the shoulders 28—28 thereof with the retaining shim or washer at the forward end of the bolt D.

From the preceding description taken in connection with the drawings, it will be evident that I have provided a shock absorbing mechanism of exceptionally high frictional capacity wherein a plurality of longitudinally disposed friction elements have frictional engagement with each other lengthwise of the mechanism and also frictional engagement with friction surfaces on the spring resisted spring followers, and wherein the friction elements are forced into tight frictional engagement with each other by wedge means on the spring followers and are further pressed into tight frictional contact with the friction surfaces of the spring followers through the wedging action provided between the friction elements.

I have herein shown and described what I now consider the preferred manner of carrying out my invention, but the same is merely illustrative and I contemplate all changes and modifications that come within the scope of the claims appended hereto:

I claim:

1. In a friction shock absorbing mechanism, the combination with end followers; of longitudinally disposed friction members engaged by said followers and moved thereby lengthwise of the mechanism with respect to each other; a pair of spring followers movable toward and away from each other, each of said spring followers having wedge faces thereon having wedging engagement with alternate friction members, each of said spring followers also having longitudinally disposed friction surfaces engaging the remainder of said members, and adjacent friction members having wedging engagement with each other to force alternate of said members laterally outwardly into tight frictional engagement with the corresponding spring follower; and spring resistance means buttressed against and yieldingly opposing relative approach of said spring followers.

2. In a friction shock absorbing mechanism, the combination with end followers movable toward and away from each other; of longitudinally disposed friction elements having interengaging friction surfaces of V-shaped transverse section, alternate of said friction elements having exterior wedge faces at one end and longitudinally disposed exterior friction surfaces at the other end said first named ends being engaged by said end followers; a pair of spring followers at opposite ends of the mechanism through which the friction elements extend, each of said spring followers having interior wedge faces and interior friction surfaces respectively engaging the exterior wedge faces and friction surfaces of said friction elements; and a spring bearing on said spring followers and yieldingly opposing relative approach of said spring followers.

3. In a friction shock absorbing mechanism, the combination with front and rear spring followers movable relatively toward and away from each other, each of said spring followers having interior outwardly diverging wedge faces and interior longitudinally disposed friction surfaces, said wedge faces of each spring follower being alternated with the friction surfaces thereof; of a central group of longitudinally disposed friction elements, each element of said group having longitudinally disposed interior friction surfaces of substantially V-shaped transverse section and each element also having an exterior wedge face at one end and an exterior longitudinally disposed friction surface at the other end, adjacent friction elements being reversely arranged end for end with the exterior friction surface of one element at the same end of the mechanism with the wedge face of the next adjacent element, the V-shaped interior friction surface of each of said elements being in wedging engagement with the corresponding surfaces of the two adjacent elements, and each element having the exterior wedge face in wedging engagement with one of the wedge faces of one of said spring followers and the exterior friction surface thereof engaged with the friction surface of the other follower; and spring means surrounding said group of friction elements, bearing at opposite ends on said spring followers and yieldingly opposing relative approach thereof.

4. In a friction shock absorbing mechanism, the combination with a plurality of longitudinally disposed friction elements having longitudinally arranged friction surfaces on the inner sides thereof in engagement with each other, said elements being movable lengthwise of the mechanism with respect to each other; of a spring follower at each end of the mechanism, each spring follower having outwardly diverging interior wedge faces, each friction element having wedging engagement with one of the wedge faces of one of said spring followers and frictional engagement with the other spring follower; and spring resistance means yieldingly opposing relative movement of said spring followers toward each other.

5. In a friction shock absorbing mechanism, the combination with front and rear spring followers having interior, outwardly diverging, opposed wedge faces; of a central group of longitudinally disposed friction elements extending through said spring followers, said friction elements having longitudinally extending friction surfaces on the inner sides thereof disposed in planes radial to the longitudinal axis of the mechanism, alternate elements having wedging engagement at one end with one of said spring followers and sliding frictional engagement with the other spring follower; and a spring interposed between said spring followers and surrounding said group of elements.

6. In a friction shock absorbing mechanism, the combination with two pairs of longitudinally disposed friction elements, each of said elements having a longitudinally disposed friction surface on the inner side thereof of V-shaped transverse section, and one of the friction elements of each pair having the V-shaped surface thereof engaging between the friction elements of the other pair, each friction element having an exterior wedge face on one end and an exterior friction surface at the other end, said elements being arranged with the wedge faces of one pair at the front end of the mechanism and with the wedge faces of the other pair at the rear end of the mechanism; of front and rear spring followers at opposite ends of the mechanism, each of said followers having a pair of interior outwardly diverging wedge faces and a pair of interior friction surfaces, said interior wedge faces and friction surfaces of each spring follower engaging respectively with the wedge faces of one pair of elements and the friction surfaces of the other pair of elements; and means yieldingly opposing relative approach of said spring followers.

7. In a friction shock absorbing mechanism, the combination with front and rear spring followers movable relatively toward and away from each other, each of said spring followers having a pair of opposed interior wedge faces diverging outwardly of the mechanism and a pair of opposed interior friction surfaces; of a central group of friction elements, each friction element of said group having longitudinally disposed friction surfaces of V-shaped transverse section on the inner side thereof engaged with the friction surfaces of two adjacent elements, the elements of said group also being movable lengthwise of the mechanism with respect to each other, each element of said group having an exterior wedge face at one end and an exterior friction surface at the other end, said wedge face and friction surface being respectively engaged with one of the interior wedge faces of one of said followers and one of the interior friction surfaces of the other spring follower; and spring resistance means surrounding said group of elements and yieldingly opposing relative approach of the spring followers.

8. In a friction shock absorbing mechanism, the combination with end followers movable toward and away from each other; of front and rear spring followers relatively movable toward and away from each other, said spring followers being normally spaced from said end followers, each of said spring followers having a pair of wedge faces and a pair of longitudinally disposed friction surfaces; two pairs of longitudinally disposed friction elements, one pair of elements being movable with respect to the other lengthwise of the mechanism, each pair of elements having wedging engagement at one end with the wedge faces of one of said spring followers and frictional engagement at the opposite end with the friction surfaces of the other spring follower, said first named ends of said pairs of elements bearing respectively on said end followers, and the friction elements of one of said pairs having wedging engagement with the friction elements of the other pair for wedging the same laterally outwardly; and spring means bearing at opposite ends on said spring followers and yieldingly opposing relative movement of said spring followers toward each other.

9. In a friction shock absorbing mechanism, the combination with two pairs of longitudinally disposed friction elements having interengaging longitudinally disposed friction surfaces on the inner sides thereof disposed in planes radial to the longitudinal axis of the mechanism, said elements of one pair being movable lengthwise of the mechanism with respect to the elements of the other pair; of a main front follower engaging the front ends of one pair of elements; a main rear follower engaging the rear ends of the other pair of elements; a front spring follower having wedging engagement with the pair of elements which is engaged by the front main follower and sliding frictional engagement with the pair of elements which is engaged by the rear main follower; a rear spring follower having wedging engagement with the pair of elements which is engaged by the rear main follower and sliding frictional engagement with the pair of elements engaged by the front main follower; and a spring resistance interposed between said spring followers and buttressed against the latter, said spring resistance yieldingly opposing relative movement of said spring followers toward each other.

BRADLEY S. JOHNSON.